United States Patent
Tada et al.

(10) Patent No.: US 6,339,038 B1
(45) Date of Patent: Jan. 15, 2002

(54) CATALYST FOR A FUEL CELL CONTAINING POLYMER SOLID ELECTROLYTE AND METHOD FOR PRODUCING CATALYST THEREOF

(75) Inventors: Tomoyuki Tada; Masahiko Inoue; Yumi Yamamoto, all of Kanagawa-ken (JP)

(73) Assignees: Tanaka Kikinzoku Kogyo K. K., Tokyo; Masahiro Watanabe, Yamanashi-ken, both of (JP)

(*) Notice: Subject to any disclaimer, the term of this patent is extended or adjusted under 35 U.S.C. 154(b) by 0 days.

(21) Appl. No.: 09/462,477
(22) PCT Filed: May 24, 1999
(86) PCT No.: PCT/JP99/02710
§ 371 Date: Jan. 18, 2000
§ 102(e) Date: Jan. 18, 2000
(87) PCT Pub. No.: WO99/66576
PCT Pub. Date: Dec. 23, 1999

(30) Foreign Application Priority Data

Jun. 16, 1998 (JP) ............................. 10-167982
Jun. 16, 1998 (JP) ............................. 10-167983

(51) Int. Cl.$^7$ .......................... B01J 23/40; B01J 23/42; B01J 21/18
(52) U.S. Cl. ................. 502/326; 502/339; 502/185; 429/40; 429/41; 429/44; 429/45; 429/46
(58) Field of Search ................... 502/326, 327, 502/332, 334, 339, 185; 429/40, 41, 44, 45, 46

(56) References Cited

U.S. PATENT DOCUMENTS 3,506,494 A * 4/1970 Adlhart ..................... 136/86
4,003,979 A * 1/1977 Kanno ..................... 423/239

(List continued on next page.)

FOREIGN PATENT DOCUMENTS

JP 57005266 A * 1/1982
JP 63-97232 4/1988

(List continued on next page.)

OTHER PUBLICATIONS

Derwent Abstract, DWPI. 1982–00934E, Dec. 1981.*

(List continued on next page.)

Primary Examiner—Stuart L. Hendrickson
Assistant Examiner—Cam N. Nguyen
(74) Attorney, Agent, or Firm—Arent Fox Kintner Plotkin & Kahn, PLLC

(57) ABSTRACT

A catalyst for a fuel cell containing polymer solid electrolyte, which catalyst contains platinum/ruthenium on a carrier in proportions of 2–4:8–6 on a mol basis and exhibits excellent resistance to catalyst poisoning attributed to carbon monoxide. In the present invention, there is disclosed a method for producing the catalyst, which-includes adding an alcohol to a mixture of an aqueous solution of a ruthenium compound and a platinum catalyst, reducing ruthenium, and causing ruthenium to precipitate at a reaction temperature between 60° C. and the boiling point of the mixture after addition of alcohol. A suitable alcohol may be ethanol or methanol in the concentration of 5–15 vol. % based on the total volume of the mixture, and a suitable heating temperature is in the vicinity of the boiling point of the mixture to which ethanol or methanol has been added. According to the present method, there can be produced a platinum/ruthenium catalyst for a fuel cell containing polymer solid electrolyte, which catalyst contains platinum particles and ruthenium particles in proximity to one another on a carrier without causing aggregation and exhibits excellent resistance to catalyst poisoning attributed to carbon monoxide.

14 Claims, 4 Drawing Sheets

U.S. PATENT DOCUMENTS

| | | | |
|---|---|---|---|
| 4,028,274 A | * 6/1977 | Kunz | 252/447 |
| 4,081,409 A | * 3/1978 | McNicol et al. | 252/472 |
| 4,263,376 A | 4/1981 | Blurton | 429/42 |
| 4,293,396 A | * 10/1981 | Allen et al. | 204/106 |
| 4,537,839 A | * 8/1985 | Cameron | 429/20 |
| 4,552,733 A | * 11/1985 | Thompson et al. | 423/213.5 |
| 4,599,157 A | * 7/1986 | Suzuki et al. | 204/192 SP |
| 4,707,229 A | * 11/1987 | Dempsey et al. | 204/129 |
| 4,781,803 A | * 11/1988 | Harris et al. | 204/129 |
| 4,849,253 A | * 7/1989 | Maricle et al. | 427/115 |
| 4,882,360 A | * 11/1989 | Stevens | 518/714 |
| 5,208,207 A | * 5/1993 | Stonehart et al. | 502/339 |
| 5,298,343 A | * 3/1994 | Savadogo et al. | 429/44 |
| 5,314,760 A | * 5/1994 | Tsou et al. | 429/12 |
| 5,387,479 A | * 2/1995 | Koksbang | 429/126 |
| 5,482,797 A | * 1/1996 | Yamada et al. | 429/218 |
| 5,543,379 A | * 8/1996 | Gubitosa et al. | 502/184 |
| 5,626,637 A | * 5/1997 | Baker | 48/127.3 |
| 5,648,307 A | * 7/1997 | Yasuda et al. | 502/101 |
| 5,843,519 A | * 12/1998 | Tada | 427/115 |
| 5,871,552 A | * 2/1999 | Tada | 29/623.5 |
| 5,891,324 A | * 4/1999 | Ohtsuka | 208/251 R |
| 5,973,912 A | * 10/1999 | Kibi et al. | 361/502 |
| 6,064,424 A | * 5/2000 | Alford | 502/416 |
| 6,103,393 A | * 8/2000 | Kodas et al. | 428/570 |
| 6,171,721 B1 | * 1/2001 | Narayanan et al. | 429/41 |

FOREIGN PATENT DOCUMENTS

| | | | |
|---|---|---|---|
| JP | 01-227361 | | 9/1989 |
| JP | 01266848 A | * | 10/1989 |
| JP | 02111440 A | * | 4/1990 |
| JP | 07-85874 | | 3/1995 |
| JP | 10-270057 | | 10/1998 |
| JP | 10-334925 | | 12/1998 |

OTHER PUBLICATIONS

Form PCT/IB/304 (Jul. 1998) PCT Notification Concerning Submission or Transmittal of Priority Document, File Ref. PCT9795P, mailed Jul. 12, 1999.

Form PCT/ISA/210 (Jul. 1998) PCT International Search Report (in Japanese), File Ref. PCT9795P.

Form PCT/IB/301 (Jul. 1998) PCT Notification of Receipt of Record Copy, File Ref. PCT9795P, mailed Jul. 7, 1999.

Form PCT/RO/101, version 2.83 (Updated Mar. 01, 1999) Request of PCT Application (part Japanese and Part English).

* cited by examiner

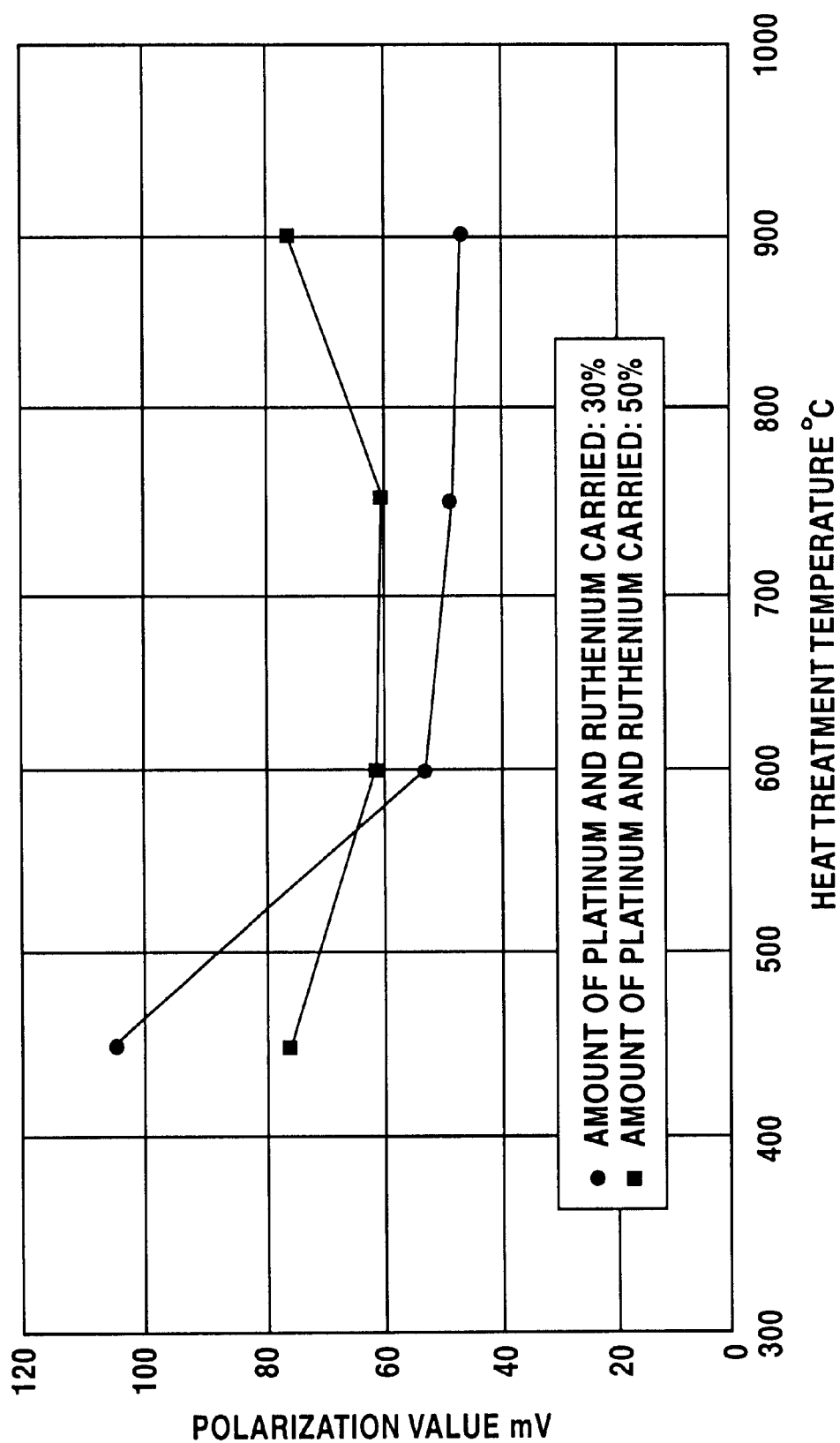

CATALYST FOR A FUEL CELL CONTAINING POLYMER SOLID ELECTROLYTE AND METHOD FOR PRODUCING CATALYST THEREOF

TECHNICAL FIELD

The present invention relates to a catalyst for a fuel cell containing a polymer solid electrolyte; and to a method for producing the catalyst. More particularly, the present invention relates to such a catalyst exhibiting excellent resistance to catalyst poisoning attributed to carbon monoxide and containing platinum and ruthenium in combination on a carrier therefor; and to a method for producing the catalyst.

BACKGROUND ART

A fuel cell containing a polymer solid electrolyte has become of interest as a power source of an electric automobile or a spacecraft, because such a cell is compact and provides higher current density as compared with a phosphoric acid fuel cell.

The fuel cell containing a polymer solid electrolyte has a layered structure in which a polymer solid electrolyte is sandwiched between a hydrogen electrode (anode) and an air electrode (cathode). Each the hydrogen electrode and the air electrode comprises a mixture of a precious metal-on-carrier catalyst and a solid electrolyte. In this structure, hydrogen gas supplied to the hydrogen electrode passes through micropores in the electrode, during which time the hydrogen gas contacts the catalyst and releases electrons by the action of the catalyst, to thereby be transformed into hydrogen ions. The hydrogen ions pass through the electrolyte in the hydrogen electrode and a solid electrolyte between the hydrogen and air electrodes, and reach the air electrode. At the air electrode, the hydrogen ions produce water as they react with oxygen supplied to the air electrode and electrons which flow into the air electrode from an outside circuit. Meanwhile, the electrons released from hydrogen pass through the catalyst carrier in the hydrogen electrode to the outside circuit and then flow into the air electrode. As a result, in the outside circuit, electrons flow from the hydrogen electrode to the air electrode, to thereby enable utilization of electric power.

As the hydrogen gas supplied to the hydrogen electrode, a hydrogen gas obtained through conversion from a liquid fuel such as methanol is considered promising, from the viewpoints of easy handling and high energy density. However, the hydrogen gas obtained through conversion contains a trace amount of carbon monoxide, which acts as a catalyst poison. Deactivation of a catalyst by poisoning adversely affects the characteristics of the fuel cell.

The catalyst which contains platinum and ruthenium in combination on a carrier has conventionally been known to exhibit excellent resistance to catalyst poisoning attributed to carbon monoxide. A possible explanation for the platinum-ruthenium catalyst's resistance to catalyst poisoning attributed to carbon monoxide is that the poisonous carbon monoxide is eliminated by the following mechanism: OH ions are bonded to ruthenium because ruthenium is a hydrophilic substance, and the OH ions on ruthenium oxidize carbon monoxide adsorbed onto platinum. Accordingly, in platinum-ruthenium catalysts, in order to maximize the effect of ruthenium; i.e., resistance to catalyst poisoning attributed to carbon monoxide, platinum particles and ruthenium particles on the carrier are preferably brought as close to one another as possible.

Conventionally, catalysts used for a fuel cell containing a polymer solid electrolyte in which metallic platinum particles and metallic ruthenium particles are carried in combination by a carrier have been prepared by the following method: an aqueous solution of a platinum compound and an aqueous solution of a ruthenium compound are mixed, and carbon powder serving as a carrier and a reducing agent such as ethyl alcohol are added thereto, to thereby reduce platinum ions and ruthenium ions so as to precipitate platinum particles and ruthenium particles on the carbon powder. The proportions of platinum and ruthenium to be carried on a carrier has typically been 1:1.

However, precious metal particles are very small, having diameters on the order of angstroms. Therefore, it is quite difficult to obtain, over the entire surface of the carrier, a regular, orderly arrangement of the particles such that platinum particles and ruthenium particles are in proximity to one another. Especially, when the proportions of platinum and ruthenium on a carrier are 1:1, platinum particles and ruthenium particles are not necessarily in proximity to one another, and upon occurrence of even the slightest segregation of the particles there may be produced a portion where platinum particles and ruthenium particles are present apart from one another on the carrier. In such a case, in the region where ruthenium particles are sparsely present, the catalyst cannot exhibit sufficient resistance to catalyst poisoning attributed to carbon monoxide, resulting in catalyst deactivation with failure to exhibit satisfactory performance as an electrode catalyst for a fuel cell containing a polymer solid electrolyte.

DISCLOSURE OF THE INVENTION

An object of the present invention is to provide a platinum/ruthenium catalyst for a fuel cell containing a polymer solid electrolyte, wherein platinum particles and ruthenium particles are carried on a carrier such that the particles of the two species exist in proximity to one another without forming an aggregate, which catalyst exhibits excellent resistance to catalyst poisoning attributed to carbon monoxide. Another object of the present invention is to provide a method for producing the catalyst.

In an attempt to attain these objects, the present inventors have examined conventional catalysts for a fuel cell containing a polymer solid electrolyte, as well as methods of producing the same, from the following two viewpoints; proportions of platinum and ruthenium carried on a carrier, and a manner of carrying platinum and ruthenium, and in connection with each viewpoint have encountered a new finding.

The catalyst for a fuel cell containing a polymer solid electrolyte, which is a first invention disclosed by the present inventors, comprises platinum and ruthenium, and a carrier therefor, wherein the proportions of platinum and ruthenium, as measured in the completed catalyst product, are 2–4:8–6 on a mol basis.

In the present invention, the probability at which ruthenium particles exist in proximity to platinum particles is increased by means of incorporating ruthenium at a proportion higher than in the conventional catalysts, and as a result, ruthenium and platinum can be held on a carrier such that ruthenium particles are found in the vicinity of every platinum particle.

Within the above-described range, the proportions of platinum and ruthenium are most preferably 4:6, in order to easily achieve the conditions in which platinum and ruthenium are in proximity to one another on the carrier and to avoid excessive consumption of platinum, which is an active species in an electrode reaction of a fuel gas. A platinum/ ruthenium catalyst produced at this ratio exhibits improved resistance to catalyst poisoning attributed to carbon monoxide and has the same catalytic activity as that of a conventional catalyst containing platinum and ruthenium in equal proportions on a carrier.

In view of application of the catalyst to a fuel cell containing a polymer solid electrolyte, the carrier bearing platinum and ruthenium at the above-described proportions is preferably a carbon powder which satisfies the definitions provided in claim 2; that is, the carrier is preferably carbon powder having micropores of a diameter of 60 Å or less in an amount of 20% or less with respect to the entirety of micropores and a specific surface area of 600–1200 m$^2$/g.

The micropore distribution is such that micropores of a diameter of 60 Å or less are limited to 20% or less of the entirety of micropores, because a solid electrolyte cannot enter micropores of a diameter of 60 Å or less. Therefore, even if platinum particles are held in such micropores, hydrogen ions released through electrode reaction are not transferred to a solid electrolyte in the electrode and hydrogen ions cannot reach an air electrode. In other words, such a limitation on micropore distribution of the carrier assures efficiency in use of the catalyst.

The specific surface area is limited within the range of 600–1200 m$^2$/g, because when a carbon powder having a specific surface area of 600 m$^2$/g or more is used, a highly dispersed state of precious metal particles can be obtained, whereas when a carbon powder having a specific surface area of 1200 m$^2$/g or more is used, micropores of a diameter of 60 Å or less account for 20% or more of the total micropores. Namely, the limitation of the specific surface area in the above-described range can provide a certain efficiency in use of the catalyst and improves the catalytic activity per unit weight of the catalyst.

In the present invention, the bimetallic catalyst for a fuel cell containing a polymer solid electrolyte, wherein platinum and ruthenium are contained in combination on a carrier, exhibits more excellent resistance to catalyst poisoning attributed to carbon monoxide under the condition that the two metals are alloyed, as described in claim 3. The catalyst containing alloyed platinum and ruthenium can be produced by application of heat treatment to the catalyst. Alloying by heat treatment can be carried out within a temperature range of 600–900° C.

Next, the present inventors studied a method for producing a catalyst for a fuel cell containing a polymer solid electrolyte, which catalyst contains platinum particles and ruthenium particles in proximity to one another on a carrier, irrespective of the proportions thereof, and as a result obtained a new finding. The method disclosed by the present inventors for producing a catalyst for a fuel cell containing a polymer solid electrolyte includes the following steps. Platinum is held on a carbon powder which serves as a carrier to thereby produce a catalyst, and the catalyst and an aqueous solution of a ruthenium compound are mixed. To the resultant mixture, an alcohol is added in an amount of 5–15 vol. % with respect to the total volume of the mixture, and the resultant solution is heated, to thereby reduce ruthenium. As a result, platinum and ruthenium are held on the carrier in combination.

The present invention was achieved on the basis of the following findings of the present inventors, who carried out careful studies on conventional methods for producing a catalyst for a fuel cell containing a polymer solid electrolyte.

When ruthenium ions in an aqueous solution are reduced by a reducing agent, if the product of the concentration of the reducing agent and the concentration of ruthenium ions is insufficient, oxidation reaction induced by the reducing agent does not occur, and therefore, ruthenium particles do not precipitate. However, even when the concentration of the reducing agent is low, if a platinum catalyst co-exists in the solution, the reducing agent is oxidized by the oxidizing action of platinum, in the vicinity of platinum particles, and electrons are released. The released electrons act on the ruthenium ions, to thereby reduce the ruthenium ions to metallic ruthenium, precipitating the metallic ruthenium on the carrier. In this event, electron donating reaction occurs only in the vicinity of the platinum particles where oxidation power prevails, and therefore, metallic ruthenium precipitates in proximity to the platinum particles.

A basic scheme of the present invention may be summarized as follows. First, a platinum catalyst is produced. The platinum catalyst is mixed with a solution of ruthenium. Thereafter, under a suitable concentration of a reducing agent, electron donating reaction between the reducing agent and ruthenium mediated by the platinum is utilized with priority. By this method, there can be obtained a composite catalyst in which the two precious metals are carried in a highly dispersed state as compared with the case of conventional methods.

The method of the present invention for producing a catalyst for a fuel cell containing a polymer solid electrolyte will next be described in detail. First, platinum microparticles are caused to be supported by a carrier to thereby obtain a platinum catalyst. An example method for producing the platinum catalyst is adding carbon powder serving as a carrier to an aqueous solution of a platinum compound, mixing, then adding a reducing agent, and mixing again, to thereby reduce platinum particles. Examples of the aqueous solution of a platinum compound include an aqueous solution of dinitrodiamineplatinum nitrate and an aqueous solution of chloroplatinic acid. Examples of the reducing agent include sodium borohydride, alcohol, and hydrogen gas, and among these, alcohol is preferred, with ethyl alcohol being particularly preferred.

Next, the platinum catalyst is added into an aqueous solution of a ruthenium compound. Examples of the aqueous solution of a ruthenium compound include aqueous solutions of ruthenium chloride, ruthenium nitrate, and a ruthenium complex, and among these, an aqueous solution of ruthenium chloride ($RuCl_3$) is preferred.

To the resultant mixture, alcohol is added as a reducing agent for ruthenium ions. As described above, the most notable characteristic feature of the present invention resides in the point that the reducing agent is oxidized by the oxidation power of the platinum catalyst and ruthenium ions are reduced by discharged electrons. In the present invention, this reaction is induced by suitable selection of alcohol species, alcohol concentration, reaction temperature, and reaction time.

Alcohol concentration is preferably 5–15 vol. % with respect to the total volume of the mixture. When the concentration is below the lower limit, ruthenium particles are difficult to reduce by the oxidation power of the platinum catalyst, whereas when concentration is higher than the upper limit, spontaneous reduction due to reducing power of the alcohol itself occurs even at a location other than the vicinity of platinum particles, leading to aggregation of ruthenium particles.

Examples of alcohol species which may be used include methyl alcohol, ethyl alcohol, propyl alcohol, and butyl alcohol. Of these, methyl alcohol and ethyl alcohol are most preferred, from the viewpoint of reducing power. Regarding the reaction temperature, the present invention may be carried out at comparatively low temperature; about 50° C. However, from the viewpoint of shortening reaction time, the reaction temperature is preferably near the boiling point of the mixture to which alcohol has been added. Generally, the reaction temperature is 90–100° C. Reaction time is preferably two hours or longer. The reason for this is that when the reaction time is shorter than two hours, reduction of ruthenium particles is incomplete, which may cause aggregation of ruthenium particles in the subsequent heat treatment for alloying. In this connection, even when the reaction time is longer than two hours, there cannot be obtained a commensurable improvement in the dispersion state of ruthenium.

The bimetallic catalyst containing platinum and ruthenium in combination on a carrier has another embodiment in which the catalyst is subjected to heat treatment for alloying so as to bring metal particles of the two species in closer proximity to one another. When alloying is performed, the catalyst exhibits even further improved resistance to catalyst poisoning attributed to carbon monoxide. Alloying by means of heat treatment is preferably carried out at 600–900° C. Temperatures below 600° C. result in incomplete alloying of precious metal particles, whereas temperatures higher than 900° C. promote aggregation of catalyst particles, providing an impermissibly large particle size and adversely affecting the catalyst activity.

In the above-described method for producing a catalyst for a fuel cell containing a polymer solid electrolyte, no particular limitations are imposed on the carrier species serving as a starting material or on the proportions of platinum and ruthenium on a carrier. However, when the proportions of platinum and ruthenium are set to 2–4:8–6, the catalyst exhibits further improved resistance to catalyst poisoning attributed to carbon monoxide.

BRIEF DESCRIPTION OF THE DRAWINGS

FIG. 4 is a graph for comparison of cell performance when heat treatment for alloying is performed at different temperatures.

BEST MODE FOR CARRYING OUT THE INVENTION

Hereinafter, preferred embodiments of the present invention will be described together with comparative examples. In the example embodiments provided herein, in order to fully describe the catalyst for a fuel cell containing polymer solid electrolyte according to the present invention as well as the relevant method for producing the catalyst according to the present invention, various carriers and different proportions of platinum and ruthenium carried by a carrier were used.

[Selection of Carriers]

As carriers, five kinds of carbon powder shown in Table 1 and having different micropore distributions and different specific surface areas were used in embodiments of the present invention and a comparative example. Table 1 shows specific surface areas of these carriers and particle diameters of catalysts prepared by the below-described methods. With regard to the characteristics of these carriers, micropore diameter was measured by the gas absorption method, and specific surface area was measured by a BET one-point method.

TABLE 1

| Sample | Trade Name | Specific Surface Area (m$^2$/g) | Particle Diameter of Catalyst (Å) |
|---|---|---|---|
| A | KETJEN BLACK EC | 800 | 36 |
| B | BLACK PEARLS 460 | 84 | 66 |
| C | VULCAN XC72 | 254 | 53 |
| D | BLACK PEARLS 1400 | 560 | 37 |
| E | KETJEN BLACK EC600JD | 1270 | 36 |

Figure 1:
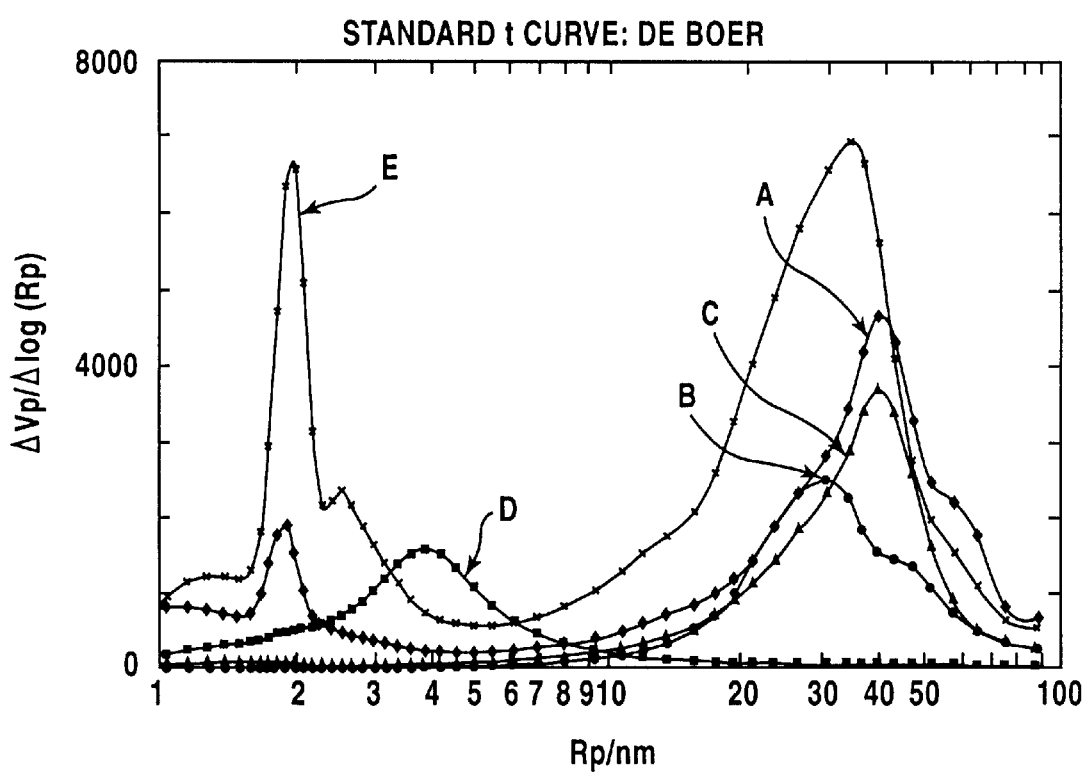
FIG. 1 is a graph showing the distribution of micropores in each carbon powder used in the Examples.

FIG. 1 shows micropore distributions. As shown in FIG. 1 and Table 1, as compared with other kinds of carbon powder, carbon powder A used as the carrier of a catalyst according to the present invention as described in claim 2 has a larger specific surface area and a smaller ratio of micropores of a diameter on the order of tens of angstroms to the entirety of micropores.

Production of Catalysts

Composite catalysts were produced according to the method of the present invention. In embodiments of the present invention, composite catalysts were produced according to the method in which ethanol or methanol was used as a reducing agent. Composite catalysts prepared by use of a conventional method serve as a basis for comparison.

(1) Production of a Catalyst by Use of Ethanol as a Reducing Agent

Preparation of a Platinum Catalyst: The relevant one of carbon powders A-E (100 g) was mixed with a solution (4500 g) of dinitrodiamineplatinum nitrate containing 1.5% platinum, and the mixture was stirred, after which 98% ethanol (550 ml) was added as a reducing agent. The solution was stirred for six hours at the boiling point (about 95° C.) for mixing, to thereby cause the platinum to be carried on the carbon powder. Precipitation of Ruthenium: Water (710 ml) was added to a solution of ruthenium chloride (35.96 g, ruthenium content: 8.232%, i.e., 2.96 g) and stirred for mixing, after which the above-described platinum catalyst (9.5 g, platinum: 3.8 g) was dipped in the resultant mixture. Further, 95% ethanol (65 ml) was added thereto and the mixture was stirred for six hours at the boiling point (about 95° C.) for reaction. After completion of the reaction, the resultant mixture was filtered, washed, and dried at 60° C., to thereby obtain a catalyst.

The present embodiment is drawn to the case in which platinum and ruthenium were held on a carrier at a ratio of 4:6. It should be noted that this ratio can be easily controlled by means of changing ruthenium content in the mixture solution; i.e., by changing the amount of an aqueous solution of ruthenium chloride. Heat Treatment: Heat treatment for alloying platinum and ruthenium was carried out under 50% hydrogen gas (balance: nitrogen) for 0.5–1 hour while the temperature was maintained at 900° C.

(2) Production of a Catalyst by Use of Methanol as a Reducing Agent

In this embodiment, a catalyst was produced by use of methyl alcohol instead of ethyl alcohol as a reducing agent. The basic scheme remained unchanged. Therefore, redundant descriptions will be omitted and only differences in the ruthenium precipitation step will be described.

The ruthenium precipitation step was carried out as follows. A platinum catalyst was prepared in the same manner as described hereinabove. Water (450 ml) was added to a solution of ruthenium chloride (35.47 g, ruthenium: 2.92 g; i.e., 8.232 wt. %) and the mixture was stirred for mixing, after which platinum catalyst (25 g, platinum: 5.64 g) was dipped in the resultant mixture. Subsequently, 95% methyl alcohol (50 ml) was added thereto, so that the methyl alcohol concentration became 10 vol. % with respect to the total volume of the mixture, and the mixture was stirred for six hours in the vicinity of the boiling point (about 95° C.) for reaction. After completion of reaction, the resultant mixture was filtered and dried, to thereby obtain a platinum/ruthenium catalyst.

(3) Comparative Example

As a comparative example for comparison with the method of the present invention, a catalyst was produced according to the customary method. Water (100 ml) was added to a solution of ruthenium chloride (35.47 g, ruthenium: 2.92 g) and the mixture was stirred for mixing, after which a platinum catalyst (25.0 g, platinum: 5.64 g) which had been prepared in advance by causing platinum to be carried on carbon powder in the same manner as described in Example 1 was added to the resultant mixture. The mixture was stirred for one hour at room temperature to thereby dip a platinum catalyst in the solution of ruthenium. Subsequently, the solution was dried at 60° C. and the dried matter was reduced at 250° C. for 0.5 hours and then at 900° C. for 0.5 hours under reflux of hydrogen, to thereby obtain a catalyst.

The thus-produced catalysts were tested for catalyst performance, using as parameters identity of the carrier, proportions of platinum and ruthenium on the carrier, and method of production.

TEST EXAMPLE 1

Figure 2:
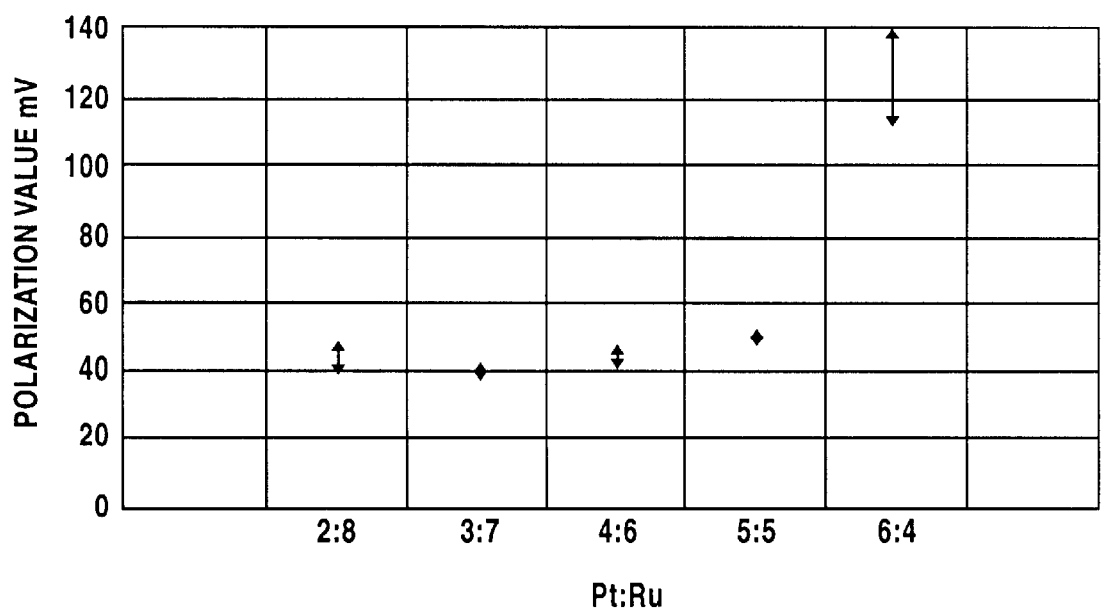
FIG. 2 is a graph for comparison of cell performance of half-cells on the side of a hydrogen electrode bearing a platinum-ruthenium catalyst at different platinum/ruthenium ratios.

Respective platinum/ruthenium catalysts produced according to the above-described method so as to cause platinum and ruthenium to be carried at different proportions on a carrier were assessed for cell performance of a half-cell on the hydrogen electrode side. Measurement was conducted in a hydrogen gas mixed with 100 ppm carbon monoxide. The results are shown in FIG. 2. In FIG. 2, the Y-axis represents polarization at a current density of 500 mA/cm$^2$ the X-axis represents the ratio of platinum to ruthenium, and polarization values of respective electrode catalysts prepared at different platinum to ruthenium ratios were plotted.

As shown in FIG. 2, the example electrode catalysts of the present invention, each containing platinum and ruthenium at proportions of 2–4:8–6 on a mol basis, exhibit almost the same performance as does a catalyst containing platinum and ruthenium at 1:1. Accordingly, lowering of the platinum content was found to have no great effect on electrode performance.

TEST EXAMPLE 2

Catalysts prepared by use of the above-described carriers A-E were tested for resistance to catalyst poisoning attributed to carbon monoxide. A single-cell-type fuel cell was made by use of each catalyst, and a drop in electric potential occurring at the point when a fuel gas was switched from 100% hydrogen gas to a hydrogen gas mixed with carbon monoxide (75% hydrogen+25% carbon dioxide+100 ppm carbon monoxide) was measured. The results are shown in Table 2. As shown in Table 2, the catalyst prepared by use of carrier A of the present invention exhibits the smallest reduction in electric potential, thus proving excellent resistance to catalyst poisoning attributed to carbon monoxide.

TABLE 2

| Sample | Drop in Electric Potential (mV) |
|--------|--------------------------------|
| A | 75 |
| B | 265 |
| C | 140 |
| D | 90 |
| E | 450 |

TEST EXAMPLE 3

Platinum/ruthenium catalysts produced according to various methods were assessed in terms of cell performance of a half-cell on the hydrogen electrode side. Measurement was conducted in a hydrogen gas mixed with 100 ppm carbon monoxide. The results of measurement at a current density of 500 mA/cm$^2$ are shown in Table 3. As shown in Table 3, all the catalysts of the present invention exhibit polarization values about 30% lower than that of the comparative example, demonstrating excellent resistance to catalyst poisoning attributed to carbon monoxide.

TABLE 3

| Sample | Polarization Value (mV) |
|--------|------------------------|
| First Embodiment | 48.5 |
| Second Embodiment | 50.2 |
| Comparative Example | 71.4 |

TEST EXAMPLE 4

Figure 3:
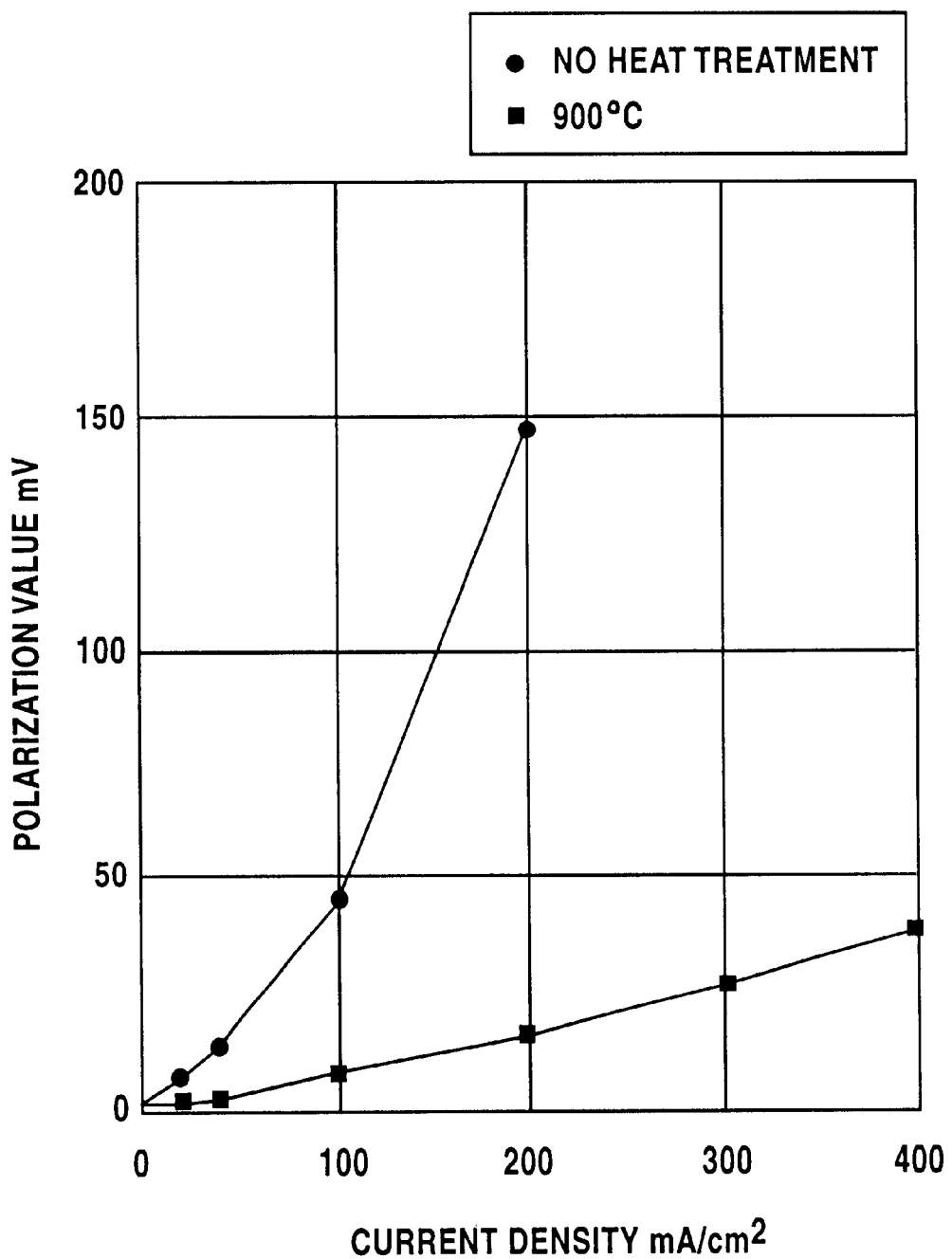
FIG. 3 is a graph for comparison of cell performance with and without heat treatment.

Effects of alloying by means of heat treatment were investigated. Cell performance of a half-cell on the hydrogen electrode side was assessed for a catalyst which had undergone heat treatment for alloying for 0.5 hour and another catalyst which had not undergone heat treatment. In the same manner as described above, measurement was conducted in a hydrogen gas mixed with 100 ppm carbon monoxide. The results are shown in FIG. 3. In FIG. 3, the Y-axis represents polarization and the X-axis represents current density, and polarization values at different current densities were plotted.

As shown in FIG. 3, the heat-treated catalyst exhibits a low polarization value at any current density, and therefore, the catalyst of the present invention has been confirmed to exhibit more excellent resistance to catalyst poisoning attributed to carbon monoxide after having been subjected to heat treatment.

TEST EXAMPLE 5

Effects of the temperature of heat treatment were investigated. Measurement was conducted under the same conditions as described above. The results are shown in FIG. 4. In FIG. 4, the Y-axis represents polarization at a current density of 500 mA/cm$^2$ and the X-axis represents the temperature of heat treatment, and polarization values of respective electrode catalysts prepared at different heat treatment temperatures were plotted. The effects of the heat-treatment temperature were compared in conjunction with changes in the amount of platinum and ruthenium carried by the catalyst; i.e., comparison was made for catalysts carrying platinum and ruthenium in an amount of 30% and 50%.

As shown in FIG. 4, a catalyst carrying platinum and ruthenium in an amount of 30% showed reduction in polarization value with increasing temperature of heat treatment, and therefore catalyst performance is shown to improve with increasing heat-treatment temperature. In other words, alloying of platinum and ruthenium proceeds with increasing heat-treatment temperature. However, in the case of a catalyst carrying platinum and ruthenium in an amount of 50%, polarization value is minimized at a temperature in the vicinity of 700° C. but increases thereafter with increasing heat-treatment temperature, and lowering of catalyst performance was observed. It is considered that when the precious metal particles are carried in excessively large amounts, aggregation of the particles occurs due to heat treatment at high temperature, which lowers catalyst performance.

INDUSTRIAL APPLICABILITY

As described hereinabove, the catalyst of the present invention used in a fuel cell containing polymer solid electrolyte contains platinum and ruthenium in proximity to one another on a carrier and is useful as a catalyst exhibiting excellent resistance to catalyst poisoning attributed to carbon monoxide. Further, according to the method for producing the catalyst of the present invention used in a fuel cell containing polymer solid electrolyte, the state in which platinum and ruthenium are held in proximity to one another on a carrier can be easily reproduced. Furthermore, when heat treatment is performed, the composite metals held on a carrier can be alloyed, and therefore, there can be produced a catalyst exhibiting more excellent resistance to catalyst poisoning attributed to carbon monoxide.

What is claimed is:

1. A catalyst for a fuel cell containing a polymer solid electrolyte, which comprises platinum and ruthenium, and a carrier therefore, wherein, the carrier is carbon powder having micropores of a diameter of 60 Å or less in an amount of 20% or less with respect to the entirety of micropores and a specific surface area of 600–1200 m$^2$/g, the proportions of platinum and ruthenium are 2–4:8–6 on a mol basis.

2. A catalyst for a fuel cell containing a polymer solid electrolyte according to claim 1, wherein the platinum and ruthenium on the carrier is in the form of an alloy.

3. A method for producing a catalyst for a fuel cell containing a polymer solid electrolyte, comprising:

adding, to an aqueous solution of a ruthenium compound, a catalyst comprising platinum and a carbon powder as a carrier therefore, to thereby prepare a mixture solution;

adding thereto an alcohol in an amount of 5–15 vol. % with respect to the total volume of the mixture; and heating the resultant mixture at 90–100° C., to thereby reduce ruthenium with an oxidation power of platinum so as to cause platinum and ruthenium to be carried in combination on the carrier.

4. A method for producing a catalyst for a fuel cell containing a polymer solid electrolyte according to claim 3, wherein the alcohol is methyl alcohol or ethyl alcohol.

5. A method for producing a catalyst for a fuel cell containing a polymer solid electrolyte according to claim 4, wherein the ruthenium compound is ruthenium chloride.

6. A method for producing a catalyst for a fuel cell containing a polymer solid electrolyte, wherein a catalyst produced through the method as recited in claim 5 is subjected to heat treatment for causing the platinum and ruthenium to be alloyed.

7. A method for producing a catalyst for a fuel cell containing a polymer solid electrolyte, as recited in claim 6 wherein the heat treatment is performed at a temperature of 600–900° C.

8. A method for producing a catalyst for a fuel cell containing a polymer solid electrolyte, wherein a catalyst produced through the method as recited in claim 4 is subjected to heat treatment for causing the platinum and ruthenium to be alloyed.

9. A method for producing a catalyst for a fuel cell containing a polymer solid electrolyte, as recited in claim 3 wherein the heat treatment is performed at a temperature of 600–900° C.

10. A method for producing a catalyst for a fuel cell containing a polymer solid electrolyte according to claim 3, wherein the ruthenium compound is ruthenium chloride.

11. A method for producing a catalyst for a fuel cell containing a polymer solid electrolyte, wherein a catalyst produced through the method as recited in claim 10 is subjected to heat treatment for causing the platinum and ruthenium to be alloyed.

12. A method for producing a catalyst for a fuel cell containing a polymer solid electrolyte, as recited in claim 11 wherein the heat treatment is performed at a temperature of 600–900° C.

13. A method for producing a catalyst for a fuel cell containing a polymer solid electrolyte, wherein a catalyst produced through the method as recited in claim 3 is subjected to heat treatment for causing the platinum and ruthenium to be alloyed.

14. A method for producing a catalyst for a fuel cell containing a polymer solid electrolyte, as recited in claim 12 wherein the heat treatment is performed at a temperature of 600–900° C.

* * * * *